(No Model.)

A. J. PHILBRICK.
VELOCIPEDE PEDAL.

No. 292,351. Patented Jan. 22, 1884.

WITNESSES
Ernest R. Benson
J. J. Gilligan

INVENTOR
Andrew J. Philbrick,
By Charles E. Pratt,
Atty.

UNITED STATES PATENT OFFICE.

ANDREW J. PHILBRICK, OF SALEM, MASSACHUSETTS, ASSIGNOR TO THE POPE MANUFACTURING COMPANY, OF HARTFORD, CONNECTICUT.

VELOCIPEDE-PEDAL.

SPECIFICATION forming part of Letters Patent No. 292,851, dated January 22, 1884.

Application filed November 19, 1883. (No model.)

*To all whom it may concern:*

Be it known that I, ANDREW J. PHILBRICK, of Salem, in the county of Essex and State of Massachusetts, have invented certain new and useful Improvements in Slippers for Velocipede-Pedals, of which the following is a specification.

Heretofore pedals for velocipedes, more especially for bicycles, have been constructed either with rubber bars to support the sole of the rider's foot, or else with metallic bars having pointed or toothed ridges to prevent slipping. Attempts have been made to combine the advantages of elasticity in the rubber bar and non-slipping quality in the metallic bar by forming one or more pieces of sheet metal so as to partly inclose the rubber bars of the pedal, and with openings in them, the edges of which were turned outward and cut into teeth to receive the sole of the shoe, and with other edges provided to rest against a barrel or middle portion of the pedal to keep the slippers from turning. Difficulties have been found with these pedal-slippers, for if the two bars were covered by the same sheet of metal no way is found of making the slipper stay surely in place, and no way is found to avoid a certain creeping action along the sole or tendency to throw the foot off the pedal by reason of the springiness and change in distance between the rows of teeth. If the slipper were made in two parts, then it was prevented from turning only in one direction, and would not stay in place, and in this latter form the construction was particularly weakened by reason of the openings left by the turned-up edges out of the same sheet of metal.

My improvements have for their object to produce a pedal-slipper applicable to any form of pedal for any velocipede, more particularly where round rubber bars are used, which cannot be pushed off the pedal by the foot in any direction, which gives the requisite metallic teeth for holding the foot in position on either operative side of the pedal, and which has durability and strength; and the nature of my improvements will be best ascertained by the following description, taken in connection with the accompanying drawings, in which similar letters of reference indicate like parts, and in which—

Figure 1:
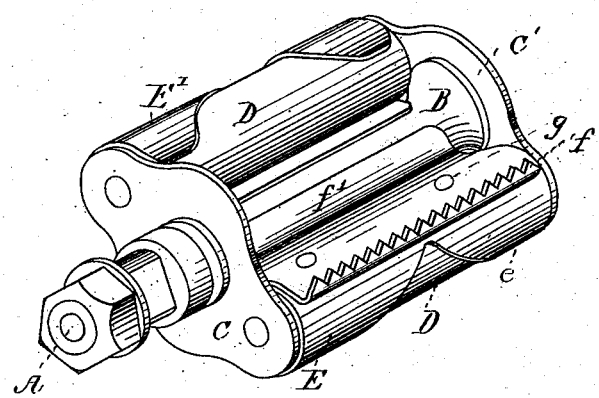
Figure 2:
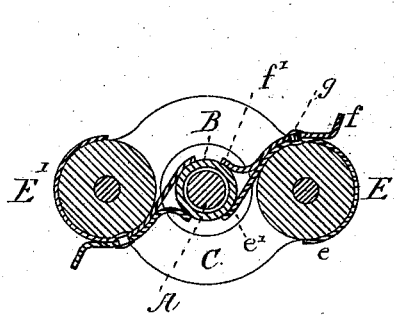
Figure 3:
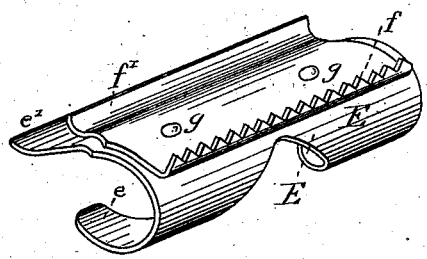

Figure 1 shows in perspective a two-bar bicycle-pedal with my improved slipper attached. Fig. 2 shows the same in transverse section, and Fig. 3 shows one complete part of my improved pedal-slipper in one form detached.

A is a pedal-pin.

B is the barrel or middle part of the pedal.

C C' are the end plates of a pedal, and D D' are the rubber bars of the pedal between the end plates.

E E' are pieces of sheet metal. Each of these bars has, as I prefer to make it, two branches, $e\ e$, with a portion of the plate removed from between them, and a reversely-curved portion, $e'$, which forms the step or rest, the whole being formed so as to more than half encircle the rubber bar to which it is to be attached, the elasticity in the bar or the spring of the metal, or both, allowing it to be forced into place, so that the branches $e\ e$ press against the rubber bar opposite the operative side, and the step $e'$ rests against the barrel of the pedal, when in place, to prevent the slipper from turning in one direction.

On the plate E is fastened, either by brazing or by rivets $g\ g$, or otherwise, another plate, F, which has along one side a raised and toothed edge, $f$, and along the other edge a raised and curved part, $f'$, which is to operate as a stop against the barrel of the pedal, to prevent the slipper from turning in one direction.

E' F' are plates similar to E and F, and on a two-bar bicycle-pedal I prefer to place two of these pedal slippers. The toothed edge $f$ engages with the sole of the rider's shoe to prevent slipping, while the rubber beneath preserves the elasticity of the pedal. The two steps $e'$ and $f'$ prevent the slipper from turning or escaping in either direction, and with only one row of teeth for the sole there is no tendency to "travel" of the foot. The metal being removed between the branches $e\ e$, there is a saving in weight, and at the same time a saving in elasticity and ease for the foot, since the narrower part of the sole between the ball of the foot which rests on the toothed edge, and the shank, which is narrow, rests on the rubber bar between the two arms on the slipper on the other bar.

I prefer to use this slipper in pairs for each pedal, though it is obvious that one slipper may be used on one bar alone, while the use of two preserves the balance, and with them the foot always finds a toothed edge to rest on.

I have shown my improvements as applied to a bicycle-pedal, and in a particular form; but I do not confine myself in these respects, since it is obvious that the form shown or the pedal used might be varied without departing from the spirit of my invention.

I claim as new and of my invention—

1. The described velocipede pedal-slipper, consisting of a curved metallic plate with one or more branches, $e$, and a stop, $e'$, and combined with a stop, $f'$, and a raised toothed edge, $f$, essentially as herein set forth.

2. As an improvement in velocipede pedal-slippers adapted for attachment to a single bar, and having a curved plate bearing a toothed edge for the sole and a stop to rest against the barrel, a secondary stop, $f'$, combined therewith, and adapted to operate essentially as set forth.

3. Constructed and adapted to operate as a pedal-slipper, the combination of two plates, E and F, one formed to hold a pedal-bar and the other formed to receive the sole of the rider's shoe, and both conformed so as to form a holding device between the rubber bar and the barrel of the pedal to prevent the slipper from turning, essentially as set forth.

A. J. PHILBRICK.

Witnesses:
GEO. B. IVES,
SAUL A. FULLER.